(12) United States Patent
Campbell et al.

(10) Patent No.: US 10,649,778 B1
(45) Date of Patent: May 12, 2020

(54) PERFORMANCE OPTIMIZED CONGRUENCE CLASS MATCHING FOR MULTIPLE CONCURRENT RADIX TRANSLATIONS

(71) Applicant: International Business Machines Corporation, Armonk, NY (US)

(72) Inventors: David Campbell, Austin, TX (US); Dwain A. Hicks, Pflugerville, TX (US); Christian Jacobi, West Park, NY (US); Kerey M. Tassin, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/208,780

(22) Filed: Dec. 4, 2018

(51) Int. Cl.
| | |
|---|---|
| *G06F 12/00* | (2006.01) |
| *G06F 9/38* | (2018.01) |
| *G06F 9/455* | (2018.01) |
| *G06F 12/14* | (2006.01) |
| *G06F 12/1009* | (2016.01) |
| *G06F 9/46* | (2006.01) |
| *G06F 12/02* | (2006.01) |
| *G06F 12/10* | (2016.01) |

(52) U.S. Cl.
CPC ........ *G06F 9/3834* (2013.01); *G06F 9/45558* (2013.01); *G06F 9/468* (2013.01); *G06F 12/0292* (2013.01); *G06F 12/10* (2013.01); *G06F 12/1009* (2013.01); *G06F 12/14* (2013.01); *G06F 2009/45583* (2013.01)

(58) Field of Classification Search
None
See application file for complete search history.

(56) References Cited

U.S. PATENT DOCUMENTS

| | | | |
|---|---|---|---|
| 5,893,931 A | 4/1999 | Peng et al. |
| 7,434,000 B1 | 10/2008 | Barreh et al. |
| 8,635,428 B2 | 1/2014 | Karlsson et al. |
| 9,092,359 B2 | 7/2015 | Bybell et al. |
| 9,244,854 B2 | 1/2016 | Gschwind |
| 2013/0339654 A1 | 12/2013 | Bybell et al. |

OTHER PUBLICATIONS

Barr; "Exploiting Address Space Contiguity to Accelerate TLB Miss Handling"; ProQuest LLC; UMI Dissertation Publishing; Apr. 2010; 106 Pages.

*Primary Examiner* — Midys Rojas
(74) *Attorney, Agent, or Firm* — Cantor Colburn LLP; Bryan Bortnick

(57) ABSTRACT

A method of optimized congruence class matching for concurrent memory translation requests to avoid memory access conflicts with respect to a virtual memory managed by a processor is provided. The method includes initiating a first table walk by a first memory access of the concurrent memory translation requests and pending a subsequent table walk initiated by a subsequent memory access of the concurrent memory translation requests. Then, the method determines whether the subsequent table walk will cause a memory access conflict with the first table walk based on the optimized congruence class matching. The subsequent memory access is rejected when the subsequent table walk will cause the memory access conflict with the first table walk.

20 Claims, 4 Drawing Sheets

US 10,649,778 B1

PERFORMANCE OPTIMIZED CONGRUENCE CLASS MATCHING FOR MULTIPLE CONCURRENT RADIX TRANSLATIONS

BACKGROUND

The disclosure relates generally to memory management unit in computer hardware, and more specifically, to performance optimized congruence class (CC) matching for multiple concurrent radix translations.

In general, when allowing a memory management unit in computer hardware to have more than one table walk state machine, it is possible that two concurrent translations that want to write to a translation lookaside buffer (TLB) are doing the same translation. As these two concurrent translations continue to write the TLB, the respective table walk state machine can create a multi-hit in a TLB CC, which is not acceptable. Therefore, the memory management unit has a need to check that one of the table walk state machines does not start if it is at all possible the another table walk state machine might be doing the same translation.

SUMMARY

According to one or more embodiments, a method of optimized congruence class matching for concurrent memory translation requests to avoid memory access conflicts with respect to a virtual memory managed by a processor is provided. The method includes initiating a first table walk by a first memory access of the concurrent memory translation requests and pending a subsequent table walk initiated by a subsequent memory access of the concurrent memory translation requests. Then, the method determines whether the subsequent table walk will cause a memory access conflict with the first table walk based on the optimized congruence class matching. The subsequent memory access is rejected when the subsequent table walk will cause the memory access conflict with the first table walk.

According to one or more embodiments, the above method can be implemented as a system, apparatus, and/or a computer program product.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter is particularly pointed out and distinctly claimed in the claims at the conclusion of the specification. The foregoing and other features, and advantages of the embodiments herein are apparent from the following detailed description taken in conjunction with the accompanying drawings in which:

DETAILED DESCRIPTION

Figure 1:
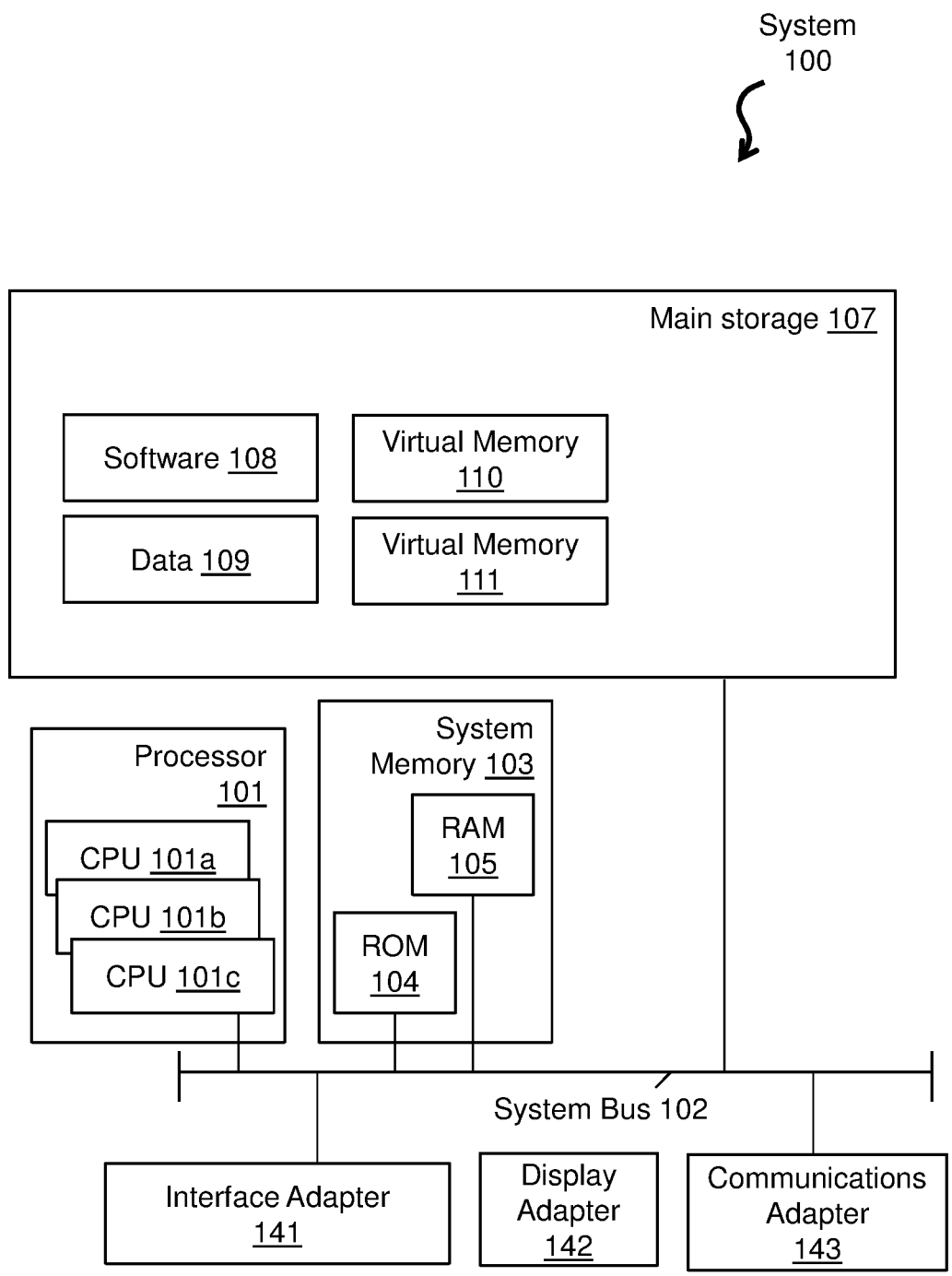
FIG. 1 depicts a system in accordance with one or more embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e., one, two, three, four, etc. The terms "a plurality" may be understood to include any integer number greater than or equal to two, i.e., two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, the memory management unit conventionally solves the need to check that one of the table walk state machines does not start if it is at all possible the another table walk state machine might be doing the same translation by utilizing multi-hit detection logic. Yet, conventional multi-hit detection logic is susceptible to severe TLB-miss performance loss because, at a time of translation, a page size of the translation is unknown. In some cases, as an original busy table walk may write to a TLB with a one gigabytes (GB) page, the conventional multi-hit detection logic utilizes a compare at a maximum page size (e.g., one GB page size in a Radix address translation of a memory management unit, as smaller page sizes are contained within the one GB page size) to guarantee that another table walk state machine is not initiated. However, more often than not, the actual page size done by the busy table walk is not to the maximum page size. In turn, not only could the other table walk have been started, the practical effect of this compare is a serialization of all table walk translations for a single thread. The serialization is due to a locality of data accesses in a behavior of the conventional multi-hit detection logic, as the conventional multi-hit detection logic is likely to be accessing data within the same one GB page. Yet, if the page size is smaller than the maximum page size (e.g., four kilobytes (kB)), then there are a lot more concurrent translations that could be loaded in the TLB if the one GB CC multi-hit detection check was not preventing them from starting a table walk.

Turning now to an overview of the aspects of the invention, one or more embodiments of the invention disclosed herein may include a system, method, and/or computer program product (herein generally referred to as a system). The system addresses the above-described shortcomings of the prior art by implementing, in a processor thereof, a power architecture utilizing tree based address translation (e.g., a Radix address translation) that does not allow speculation on a maximum page size. Embodiments of the tree based address translation herein slice virtual memory addresses into segments with respect to hierarchal directories of a tree, where each segment of a virtual address indexes into a next directory/level of the tree.

More particularly, in the tree based address translation, the system determines a page size in a level of a table walk (e.g., the page size directly relates to a depth of a tree, which can vary per virtual memory address). For example, a one GB page size is found in a level two (L2) page table entry in the table walk, a two megabyte (MB) page size is found in a level three (L3) page table entry in the table walk, a 64 KB Page size is found in a level four (L4) page table entry, a next level size (NLS) field in a L3 page directory entry is five, and a four KB page size is found in an L4 page table entry, and an NLS field in the L4 page directory entry is 9. Since each level of the table walk requires a memory access (which can miss in the L3 cache as a worst case), one or more embodiments of the invention disprove that the busy table walk is translating a specific page size as the walk progresses.

In turn, if an L2 page directory entry is found, then the system can conclude that the table walk is not translating a one GB page size. Thus, other translations missing the TLB that match on the one GB page can possibly start a table walk state machine. The system implements this operation at each large page size because, as the table walk progresses, the system can conclude that the larger page sizes are not relevant in the CC check. Furthermore, in the presence of a page cache walk (PWC), if there is a hit at certain levels in the PWC, the system immediately disproves that the translation is to a specific page. Note that a PWC will cache intermediate page directory entries (PDEs) of the radix walk. Further, the PWC allows the table walk to start somewhere in the middle of the table walk, as opposed to the beginning of the table walk when a TLB miss occurs. Additionally, for a multi-threaded processor, the system adds special checks for an effective logical partition identification (effLPID) matching across the concurrent translations. An effLPID is a virtual machine identifier in the power architecture. For process-scoped translations only, the system checks for a match on an effective process identification (effPID to prohibit this match from occurring across different logical partitions and the applications manage therein. Thus, embodiments described herein are necessarily rooted in the system and processors thereof to perform proactive operations to overcome problems specifically arising in the realm of memory management unit in computer hardware. Note that the particular address space identifiers (ASIDs) for a power architecture are utilized herein are by way of example only and other identifications and system are contemplated.

Turning now to FIG. 1, a system 100 for implementing the teachings herein is shown in according to one or more embodiments of the invention. In general, the system 100 support virtual memories, whose translations are organized in such a way that there are multiple steps in a table walk.

In this embodiment, the system 100 has a processor 101, which can include one or more central processing units (CPUs) 101a, 101b, 101c, etc. The processor 101, also referred to as a processing circuit, microprocessor, computing unit, is coupled via a system bus 102 to a system memory 103 and various other components. The system memory 103 includes read only memory (ROM) 104 and random access memory (RAM) 105. The ROM 104 is coupled to the system bus 102 and may include a basic input/output system (BIOS), which controls certain basic functions of the system 100. The RAM is read-write memory coupled to the system bus 102 for use by the processor 101.

The system 100 of FIG. 1 includes a main storage 107, which is an example of a tangible storage medium readable executable by the processor 101. The main storage 107 stores software 108 and data 109 and operates one or more instances of virtual memory 110 and 111. The software 108 is stored as instructions for execution on the system 100 by the processor 101 (to perform a process, such as the process flows of FIGS. 2-4). The data 109 includes a set of values of qualitative or quantitative variables organized in various data structures to support and be used by operations of the software 108. The one or more instances of virtual memory 110 and 111 are memory management techniques that provide resource abstraction of the main storage 107 via mapping virtual memory addresses to physical memory addresses. Operations of the system 100 relating to managing the one or more instances of virtual memory 110 and 111 (e.g., determining page size in a level of a table walk in Radix address translations) are described with respect to FIG. 2-4. Note that a radix tree structure and a page size determination based on levels are exemplary, as different systems can construct different tree structures. For instance, the system 100 can be implemented through all virtualization layers including, but not limited to, guest operating system addresses, host (hypervisor) managed memory addresses, "bare metal" OS's addresses, "bare metal" application addresses, and guest operating system application addresses.

The system 100 of FIG. 1 includes one or more adapters (e.g., main storage controllers, network adapters, graphics adapters, etc.) that interconnect and support communications between the processor 101, the system memory 103, the main storage 107, and other components of the system 100 (e.g., peripheral and external devices). In one or more embodiments of the present invention, the one or more adapters can be connected to one or more I/O buses that are connected to the system bus 102 via an intermediate bus bridge, and the one or more I/O buses can utilize common protocols, such as the Peripheral Component Interconnect (PCI).

As shown, the system 100 includes an interface adapter 141 interconnecting a keyboard, a mouse, a speaker, and a microphone to the system bus 102. The system 100 includes a display adapter 142 interconnecting the system bus 102 to a display. The system 100 includes a communications adapter 141 interconnecting the system bus 102 with a network enabling the system 100 to communicate with other systems, devices, data, and software, such as a server and a database.

Thus, as configured in FIG. 1, the operations of the software 108 and the data 109 (e.g., the system 100) are necessarily rooted in the computational ability of the processor 101 to overcome and address the herein-described shortcomings of the conventional multi-hit detection logic. In this regard, the software 108 and the data 109 provide the technical effects and benefits and improve computational operations of the processor 101 of the system 100 by eliminating severe TLB-miss performance loss and preventing concurrent translations that will not cause multi-hits from starting a table walk (thereby increasing the efficiency of the system 100).

Figure 2:
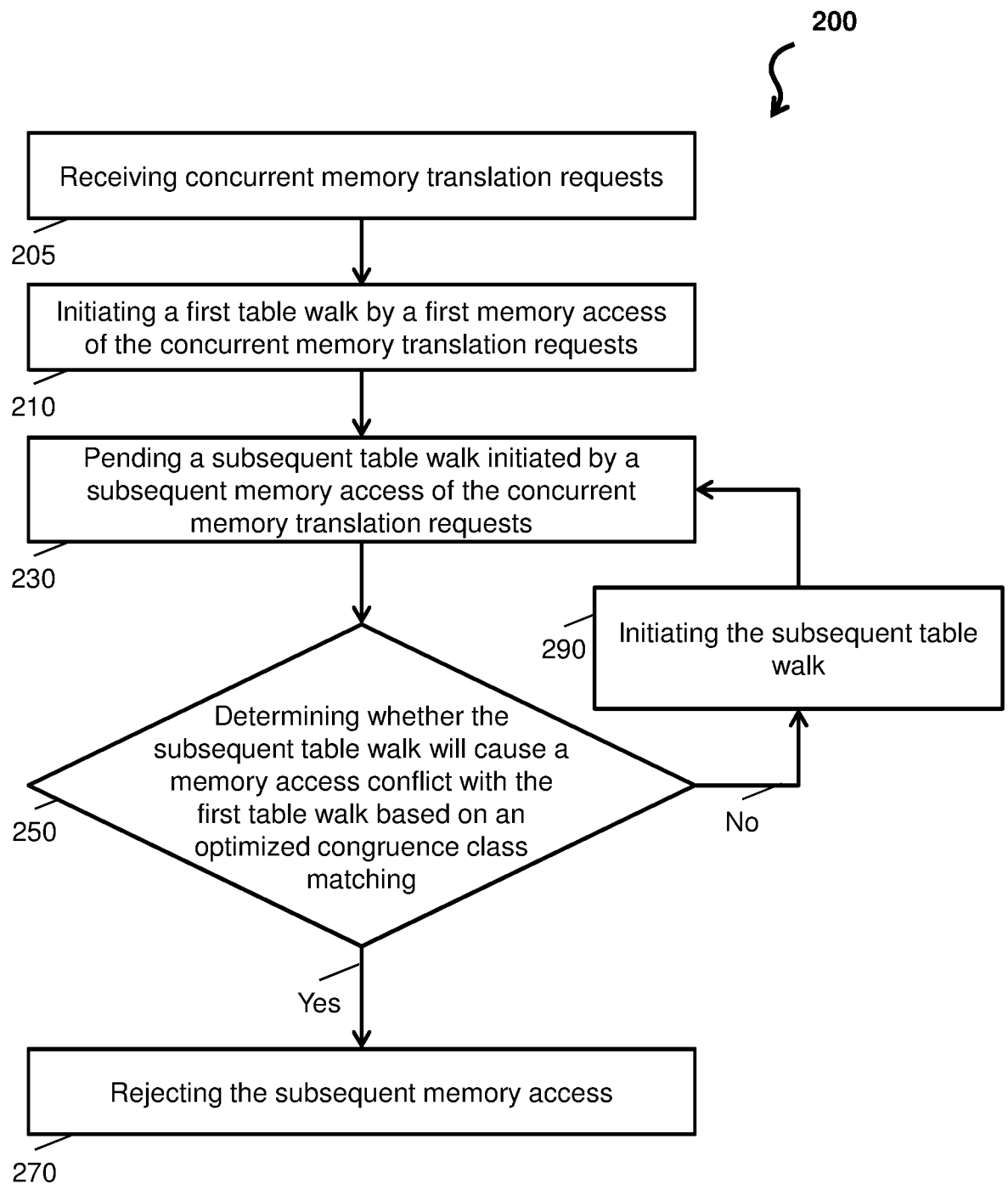
FIG. 2 depicts a process flow in accordance with one or more embodiments.

Turning now to FIG. 2, a process flow 200 is depicted in accordance with one or more embodiments. In general, the process flow 200 is an example of the system 100 implementing an optimized CC matching for concurrent memory translation requests to avoid memory access conflicts with respect to the one or more instances of virtual memory 110 and 111.

The process flow 200 begins at block 205, where the system 100 receives the concurrent memory translation requests. The concurrent memory translation requests enable table walks that translate virtual memory addresses (of the one or more instances of virtual memory 110 and 111) to physical memory addresses of the main storage 107 to provide resource abstraction. At block 210, the system 100 initiates a first table walk by a first memory access of the concurrent memory translation requests. At block 230, the system 100 pends (stalls or holds) a subsequent table walk initiated by a subsequent memory access of the concurrent memory translation requests. As described with respect to decision block 250, pending the subsequent table walk enables the system 100 to disprove page sizes between the table walks to identify and avoid the memory access conflicts.

At block 250, the system 100 determines whether the subsequent table walk will cause a memory access conflict with the first table walk based on the optimized CC matching. In the optimized CC matching, a page size determination in a second level (e.g., L1) of a first table walk is made. Then, that page size (which can be the maximum page size) is used in a compare (e.g., a CC matching) to a subsequent table walk. During the CC matching, the system 100 iterates down in levels as the first table walk is proven to not (e.g., disproved) have the same page size (e.g., congruent class) of the subsequent table walk on each level. Once the system 100 has disproven the higher levels (e.g., L2 and L1), the system 100 has a very precise compare operation that is able to exclude the subsequent table walk based on L3.

Returning to decision block 250, if the system 100 determines that the subsequent table walk will cause the memory access conflict with the first table walk, then the process flow 200 proceeds to block 270 (as shown by the Yes arrow). At block 270, the system 100 rejects the subsequent table walk. If the system 100 determines that the subsequent table walk will cause the memory access conflict with the first table walk, then the process flow 200 proceeds to block 290 (as shown by the No arrow). At block 290, the system 100 initiates the subsequent table walk when the subsequent table walk will not cause the memory access conflict with the first table walk. Note that when a subsequent table walk is rejected, the subsequent table can come again later by some means of a micro-architectural design to attempt to start a table walk or discover a TLB hit because the first table walk had installed its translation in the TLB (that is, if they were in fact to the same page).

Figure 3:
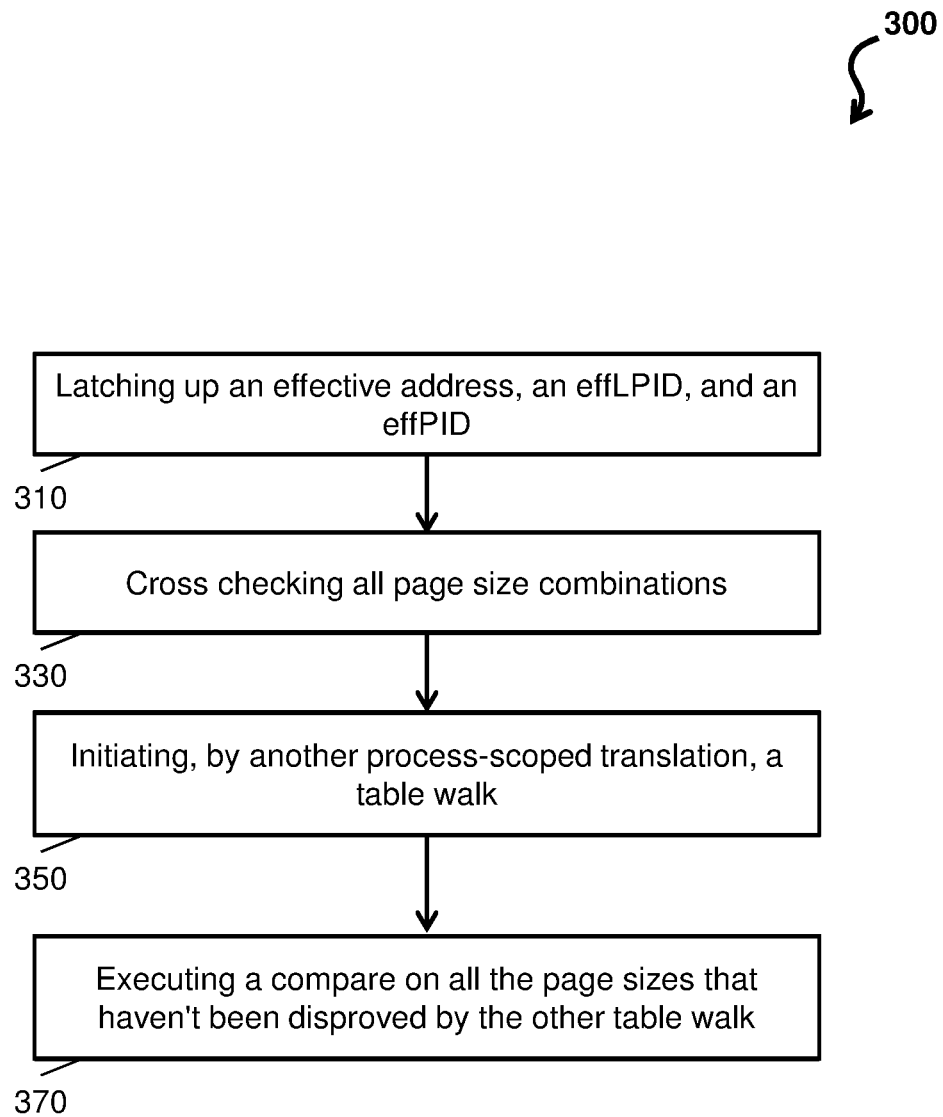
FIG. 3 depicts a process flow in accordance with one or more embodiments.

Turning now to FIG. 3, a process flow 300 is depicted in accordance with one or more embodiments. The process flow 300 is an example of the system 100 implementing a radix process scoped CC matching.

At block 310, which is the start of a table walk, an effective address, an effLPID, and an effPID are latched up to determine whether another translation can match. At block 330, the table walk cross checks all page size combinations by matching against the effective address (EA) until the system 100 can disprove that a certain page size is definitely not relevant to the table walk's translation. In accordance with one or more embodiments, the scenarios when the system 100 can disprove a page size is relevant to a given translation include: one GB page, which is disproved when a L2 guest PDE is found in a table walk, a L2 guest PWC hit is found, or a L3 PWC hit is found; two MB page, which is disproved when a L3 guest PDE is found in a table walk or a L3 guest PWC hit is found; 64 KB page, which is disproved when a L3 guest PDE is found with NLS=five or a L3 PWC hit is found with pgsize=four KB; and four KN page, which is the smallest page size and is determined by process of elimination of the other L3 page sizes.

At block 350, another process-scoped translation tries to initiate a table walk. At block 370, the system 100 executes a compare on all the page sizes that haven't been disproved by the other table walk. In accordance with one or more embodiments, the match can be defined as follows: compare on EA bits (30:33) if one GB page size not disproved (note we limit the size of the comparator to save hardware resources); compare on EA bits (30:42) if two MB page size not disproved; compare on EA bits (30:47) if 64 KB page size not disproved; and compare on EA bits (30:51) always for 4 KB page size (smallest possible page size).

Figure 4:
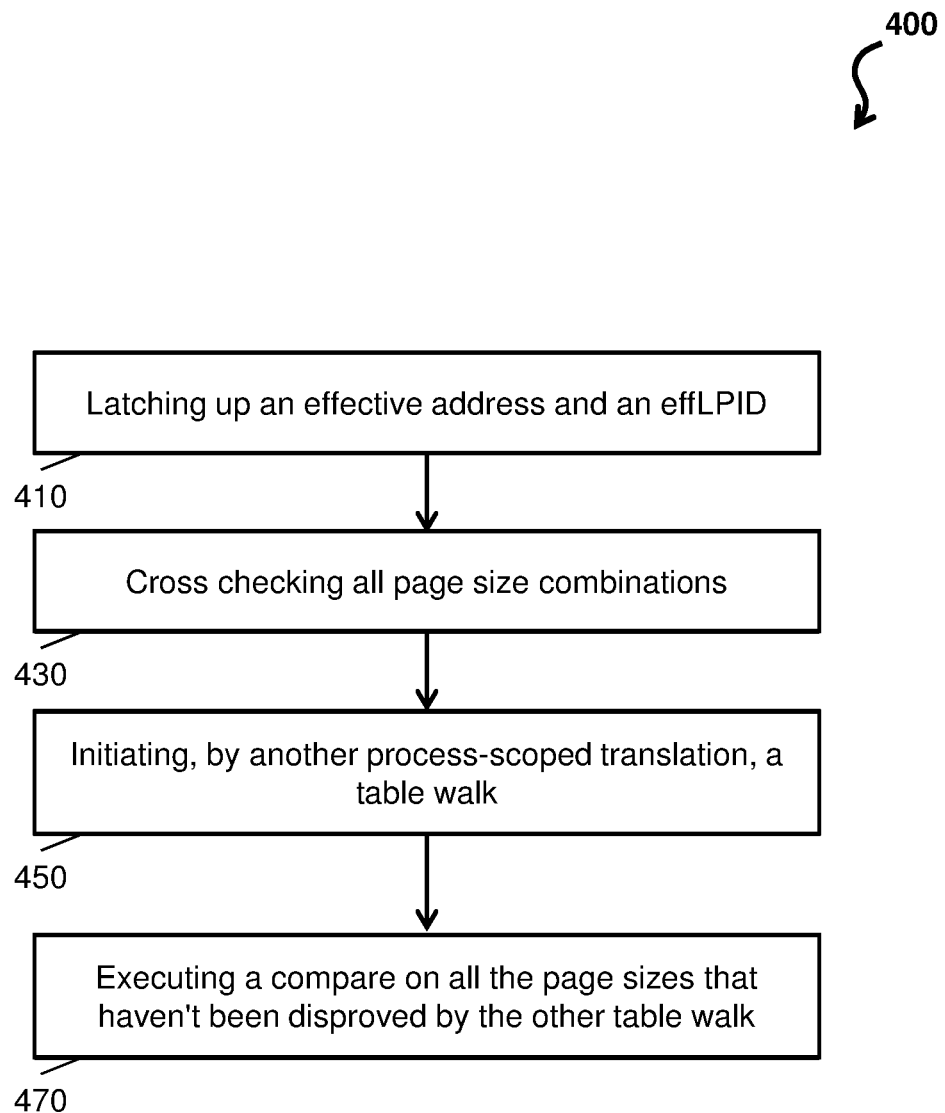
FIG. 4 depicts a process flow in accordance with one or more embodiments.

Turning now to FIG. 4, a process flow 400 is depicted in accordance with one or more embodiments. The process flow 400 is an example of the system 100 implementing a radix partition scoped CC matching.

At block 410, which is the start of a table walk, an effective address and an effLPID are latched up to determine whether another translation can match. At block 430, the table walk cross checks all page size combinations by matching against the EA until the system 100 can disprove that a certain page size is definitely not relevant to the table walk's translation. Note that this includes any operating system in a real mode arbitrating the TLB or another busy table walk working on a nested translation (that wants to initiate a partition scoped translation). Though the table walk is already busy, in reality, it is not yet busy doing the partition-scoped part of the walk. Thus, the partition scope check must be done at each intermediate step in a nested walk.

In accordance with one or more embodiments, the scenarios when the system 100 can disprove a page size is relevant to a given translation include: compare on EA bits (30:33) if one GB page size not disproved (note we limit the size of the comparator to save hardware resources); compare on EA bits (30:42) if two MB page size not disproved; compare on EA bits (30:47) if 64 KB page size not disproved; and compare on EA bits (30:51) always for 4 KB page size (smallest possible page size).

At block 450, another process-scoped translation tries to initiate a table walk. At block 470, the system 100 executes a compare on all the page sizes that haven't been disproved by the other table walk. In accordance with one or more embodiments, the match can be defined as follows: compare on EA bits (30:33) if one GB page size not disproved (note we limit the size of the comparator to save hardware resources); compare on EA bits (30:42) if two MB page size not disproved; compare on EA bits (30:47) if 64 KB page size not disproved; and compare on EA bits (30:51) always for 4 KB page size (smallest possible page size).

Other deviations and iterations of embodiments of the system 100 herein can include different sizes and comparator combinations, while maintaining a disproval rubric as any walk progresses (e.g., which is not a choice of comparator fields). Not that the comparators; however, still need to be chosen for the system 100 to be functionally correct. Yet, the embodiments of the system 100 pertain to all virtualization layers including address collisions found in a nested table walk, and by clarifying that a rejected address comes back by some micro-architectural means, the embodiments of the system 100 can cover all cases (e.g., an intermediate walk in a nested radix or n a fresh new table walk).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of optimized congruence class matching for concurrent memory translation requests to avoid memory access conflicts with respect to a virtual memory managed by a processor, the method comprising:
   initiating, by the processor, a first table walk by a first memory access of the concurrent memory translation requests;
   pending, by the processor, a subsequent table walk initiated by a subsequent memory access of the concurrent memory translation requests;
   determining, by the processor, whether the subsequent table walk will cause a memory access conflict with the first table walk based on the optimized congruence class matching; and
   rejecting, by the processor, the subsequent memory access when the subsequent table walk will cause the memory access conflict with the first table walk.

2. The method of claim 1, wherein the method comprises: receiving the concurrent memory translation requests.

3. The method of claim 1, wherein the method comprises: initiating the subsequent table walk initiated when the subsequent table walk will not cause the memory access conflict with the first table walk.

4. The method of claim 1, wherein the method comprises: initiating the subsequent table walk when the subsequent table walk will not cause the memory access conflict with the first table walk.

5. The method of claim 1, wherein the optimized congruence class matching comprises:
   determining a page size in a first level of the first table walk is made;
   comparing the page size to a subsequent table walk; and
   iterating down in levels as the first table walk is proven to not have a same page size of the subsequent table walk on each level.

6. The method of claim 1, wherein the optimized congruence class matching comprises a radix process scoped congruent class matching.

7. The method of claim 1, wherein the optimized congruence class matching comprises a radix partition scoped congruent class matching.

8. A computer program product for optimized congruence class matching for concurrent memory translation requests to avoid memory access conflicts with respect to a virtual memory managed by a processor, the computer program product comprising a computer readable storage medium having program instructions embodied therewith, the program instructions executable by a processor to cause:
   initiating, by the processor, a first table walk by a first memory access of the concurrent memory translation requests;
   pending, by the processor, a subsequent table walk initiated by a subsequent memory access of the concurrent memory translation requests;
   determining, by the processor, whether the subsequent table walk will cause a memory access conflict with the first table walk based on the optimized congruence class matching; and
   rejecting, by the processor, the subsequent memory access when the subsequent table walk will cause the memory access conflict with the first table walk.

9. The computer program product of claim 8, wherein the program instructions are executable by the processor to cause:
   receiving the concurrent memory translation requests.

10. The computer program product of claim 8, wherein the program instructions are executable by the processor to cause:
    initiating the subsequent table walk initiated when the subsequent table walk will not cause the memory access conflict with the first table walk.

11. The computer program product of claim 8, wherein the program instructions are executable by the processor to cause:
    initiating the subsequent table walk when the subsequent table walk will not cause the memory access conflict with the first table walk.

12. The computer program product of claim 8, wherein the optimized congruence class matching comprises:
    determining a page size in a first level of the first table walk is made;
    comparing the page size to a subsequent table walk; and
    iterating down in levels as the first table walk is proven to not have a same page size of the subsequent table walk on each level.

13. The computer program product of claim 8, wherein the optimized congruence class matching comprises a radix process scoped congruent class matching.

14. The computer program product of claim 8, wherein the optimized congruence class matching comprises a radix partition scoped congruent class matching.

15. A system comprising a processor and a memory storing program instructions thereon, the memory further supporting a virtual memory, the program instructions for optimized congruence class matching for concurrent memory translation requests to avoid memory access conflicts with respect to the virtual memory managed by the processor, the program instructions executable to cause:
    initiating, by the processor, a first table walk by a first memory access of the concurrent memory translation requests;
    pending, by the processor, a subsequent table walk initiated by a subsequent memory access of the concurrent memory translation requests;
    determining, by the processor, whether the subsequent table walk will cause a memory access conflict with the first table walk based on the optimized congruence class matching; and
    rejecting, by the processor, the subsequent memory access when the subsequent table walk will cause the memory access conflict with the first table walk.

16. The system of claim 15, wherein the program instructions are executable to cause:
    receiving the concurrent memory translation requests.

17. The system of claim 15, wherein the program instructions are executable to cause:
    initiating the subsequent table walk initiated when the subsequent table walk will not cause the memory access conflict with the first table walk.

18. The system of claim 15, wherein the program instructions are executable to cause:
    initiating the subsequent table walk when the subsequent table walk will not cause the memory access conflict with the first table walk.

19. The system of claim 15, wherein the optimized congruence class matching comprises:
    determining a page size in a first level of the first table walk is made;
    comparing the page size to a subsequent table walk; and
    iterating down in levels as the first table walk is proven to not have a same page size of the subsequent table walk on each level.

20. The system of claim 15, wherein the optimized congruence class matching comprises a radix process scoped congruent class matching.

* * * * *